United States Patent
Tanaka

(10) Patent No.: US 8,891,973 B2
(45) Date of Patent: Nov. 18, 2014

(54) RECEIVING UNIT, OPTICAL LINE TERMINAL, AND FREQUENCY CALIBRATION METHOD FOR CLOCK AND DATA RECOVERY CIRCUIT

(75) Inventor: Naruto Tanaka, Osaka (JP)

(73) Assignees: Sumitomo Electric Industries, Ltd., Osaka (JP); Ensphere Solutions, Inc., Santa Clara, CA (US)

( * ) Notice: Subject to any disclaimer, the term of this patent is extended or adjusted under 35 U.S.C. 154(b) by 431 days.

(21) Appl. No.: 13/203,787

(22) PCT Filed: Jul. 6, 2010

(86) PCT No.: PCT/JP2010/061463
§ 371 (c)(1),
(2), (4) Date: Aug. 29, 2011

(87) PCT Pub. No.: WO2011/013485
PCT Pub. Date: Feb. 3, 2011

(65) Prior Publication Data
US 2012/0008954 A1     Jan. 12, 2012

(30) Foreign Application Priority Data

Jul. 30, 2009   (JP) ................................. 2009-178027

(51) Int. Cl.
| | | |
|---|---|---|
| H04J 14/08 | (2006.01) | |
| H04B 10/272 | (2013.01) | |
| H04B 10/69 | (2013.01) | |
| H04L 7/033 | (2006.01) | |
| H04B 10/00 | (2013.01) | |
| H04J 3/16 | (2006.01) | |

(52) U.S. Cl.
CPC ............. *H04L 7/033* (2013.01); *H04B 10/272* (2013.01); *H04B 10/69* (2013.01); *H04J 3/1694* (2013.01)
USPC ................................ 398/155; 398/99; 398/98

(58) Field of Classification Search
CPC ........................................................ H04B 10/69
USPC ............................................. 398/155, 98–100
See application file for complete search history.

(56) References Cited

U.S. PATENT DOCUMENTS

| | | | |
|---|---|---|---|
| 2004/0189417 A1 | 9/2004 | Fujita | |
| 2005/0135813 A1* | 6/2005 | Cao | ............................... 398/140 |
| 2006/0077015 A1 | 4/2006 | Fujita | |
| 2006/0194606 A1* | 8/2006 | Furuya et al. | .............. 455/550.1 |

FOREIGN PATENT DOCUMENTS

| | | |
|---|---|---|
| JP | 2004-320721 | 11/2004 |
| JP | 2008-172665 | 7/2008 |

* cited by examiner

*Primary Examiner* — Daniel Dobson
(74) *Attorney, Agent, or Firm* — McDermott Will & Emery LLP

(57) ABSTRACT

A receiving unit using a voltage-controlled oscillator is allowed to compensate for the frequency characteristics of the voltage-controlled oscillator resulting from temperature change, without adding a capacitive element for temperature compensation. A receiving unit and an optical line terminal include a clock and data recovery circuit that extracts a clock signal and a data signal from a received signal, and have: a calibrator that calibrates an oscillation frequency of a voltage-controlled oscillator included in the clock and data recovery circuit; and a managing unit having a function of managing a schedule for receiving signals, the managing unit selecting a time where a duration of a certain state meets a time required for calibration by the calibrator to thereby output a reset signal (calibration instruction signal) to the calibrator, the state having no received signal (upstream signal) from which a clock signal and a data signal are to be extracted.

6 Claims, 15 Drawing Sheets

RECEIVING UNIT, OPTICAL LINE TERMINAL, AND FREQUENCY CALIBRATION METHOD FOR CLOCK AND DATA RECOVERY CIRCUIT

RELATED APPLICATIONS

This application is the U.S. National Phase under 35 U.S.C. §371 of International Application No. PCT/JP2010/061463, filed on Jul. 6, 2010, which in turn claims the benefit of Japanese Application No. 2009-178027, filed on Jul. 30, 2009, the disclosures of which Applications are incorporated by reference herein.

TECHNICAL FIELD

The present invention relates to a receiving unit including a clock and data recovery circuit, and an optical line terminal including the receiving unit in, for example, a PON (Passive Optical Network) system. More particularly, the present invention relates to a technique for adjusting the oscillation frequency of a voltage-controlled oscillator provided in a clock and data recovery circuit.

BACKGROUND ART

A PON system consists of a plurality of optical network units (home side apparatuses) and an optical line terminal connected thereto through optical fibers. The optical line terminal is equipped with clock and data recovery circuits that extract clock signals and data signals from upstream signals transmitted from the optical network units (see, for example, Patent Document 1).

A clock and data recovery circuit includes a voltage-controlled oscillator (VCO) that outputs an oscillation frequency according to a control voltage. The output characteristics of the voltage-controlled oscillator are slightly changed by variations in element characteristics or by temperature change. Hence, there is proposed an oscillator in which variable capacitors for compensating the element characteristics are provided to adjust capacitance to compensate for variations in element characteristics, and for temperature, variable capacitors for compensation are separately provided to perform temperature compensation by changing capacitance based on information from a temperature detector (see, for example, Patent Document 2).

CITATION LIST

Patent Literature

Patent Document 1: Japanese Patent Application Laid-Open No. 2008-172665 (FIG. 5)
Patent Document 2: Japanese Patent Application Laid-Open No. 2004-320721 (FIG. 1)

SUMMARY OF INVENTION

To perform temperature compensation by a voltage-controlled oscillator such as that described above, a process of detecting fluctuations by continuously monitoring frequency, and compensating for the fluctuations is required. However, in a P2MP (Point to Multi-Point) communication system such as a PON system, since a received signal is discontinuous, fluctuations in the frequency of a voltage-controlled oscillator are large during phase-locked operation of a clock and data recovery circuit. It is difficult to detect a very small frequency change caused by temperature change, which is included in such large fluctuations. In addition, there is a problem that providing variable capacitors for temperature compensation separately from variable capacitors for element characteristic compensation increases the number of capacitive elements, resulting in the stray capacitance of wiring, etc., becoming non-negligible.

In view of such conventional problems, an object of the present invention is to allow a receiving unit using a voltage-controlled oscillator or an optical line terminal to compensate for the frequency characteristics of the voltage-controlled oscillator resulting from temperature change, without increasing the number of capacitive elements for temperature compensation.

(1) The present invention is directed to a receiving unit including a clock and data recovery circuit that extracts a clock signal and a data signal from a received signal, the receiving unit comprising:

a calibrator that calibrates an oscillation frequency of a voltage-controlled oscillator included in the clock and data recovery circuit; and a managing unit having a function of managing a schedule for receiving signals, the managing unit selecting a time where a duration of a certain state meets a time required for calibration by the calibrator to thereby output a calibration instruction signal to the calibrator, the state having no received signal from which a clock signal and a data signal are to be extracted.

In the receiving unit configured in the above-described manner, when the duration of a state having no received signal from which a clock signal and a data signal are to be extracted (so to speak, a free time) is greater than or equal to the time required for calibration, a calibration instruction signal is outputted to the calibrator from the managing unit, whereby the oscillation frequency of the voltage-controlled oscillator is calibrated. By performing such calibration as needed, frequency changes caused by changes in temperature can be calibrated. Therefore, without providing a capacitive element for temperature compensation, the frequency characteristics of the voltage-controlled oscillator resulting from temperature change can be compensated for.

(2) Meanwhile, the present invention is directed to an optical line terminal that configures a PON system with a plurality of optical network units establishing a one-to-multiple connection therewith through optical fibers, and that receives, by a time-division multiplexing scheme, upstream signals transmitted from the optical network units, the optical line terminal comprising:

a clock and data recovery circuit having a voltage-controlled oscillator and a calibrator that calibrates an oscillation frequency of the voltage-controlled oscillator, the clock and data recovery circuit extracting clock signals and data signals from the upstream signals; and a managing unit having a function of managing a schedule for receiving the upstream signals, the managing unit selecting a time where a duration of a certain state meets a time required for calibration by the calibrator to thereby output a calibration instruction signal to the calibrator, the state having no upstream signal from which a clock signal and a data signal are to be extracted.

In the optical line terminal configured in the above-described manner, when the duration of a state having no upstream signal from which a clock signal and a data signal are to be extracted (so to speak, a free time) is greater than or equal to the time required for calibration, a calibration instruction signal is outputted to the calibrator from the managing unit, whereby the oscillation frequency of the voltage-controlled oscillator is calibrated. By performing such calibration as needed, frequency changes caused by changes in temperature can be calibrated. Therefore, without providing a capacitive element for temperature compensation, the frequency characteristics of the voltage-controlled oscillator resulting from temperature change can be compensated for.

(3) In the optical line terminal described in (2), the managing unit may output the calibration instruction signal during a no-signal section within a discovery period for searching for a new optical network unit, the no-signal section occurring after completion of discovery.

In this case, calibration can be performed by effectively using a no-signal section in the second half of a discovery period which is periodically assigned.

(4) In addition, in the optical line terminal described in (2), the managing unit may repeat use of one of a plurality of periods to output the calibration instruction signal, the plurality of periods being assignable as discovery periods for searching for a new optical network unit.

In this case, calibration can be repeatedly and reliably performed by using one of a plurality of periods which are assignable as discovery periods.

(5) In addition, the present invention is directed to an optical line terminal that configures a PON system with a plurality of optical network units establishing a one-to-multiple connection therewith through optical fibers, and that receives, by a time-division multiplexing scheme, upstream signals with a plurality of transmission rates transmitted from the optical network units, the optical line terminal comprising:

a managing unit having a function of managing a schedule for receiving the upstream signals; and a plurality of clock and data recovery circuits, each having a voltage-controlled oscillator and a calibrator that calibrates an oscillation frequency of the voltage-controlled oscillator in response to a calibration instruction signal from the managing unit, the plurality of clock and data recovery circuits extracting clock signals and data signals for the upstream signals at a plurality of different types of transmission rates, wherein when a duration of a state in which any one of the clock and data recovery circuits continuously handles an upstream signal meets a time required to calibrate an oscillation frequency of a voltage-controlled oscillator in an other clock and data recovery circuit, the managing unit may output a calibration instruction signal to a calibrator in the other clock and data recovery circuit.

In the optical line terminal configured in the above-described manner, when the duration of a state in which any one of the clock and data recovery circuits continuously handles an upstream signal (so to speak, a free time for the other clock and data recovery circuit) meets the time required to calibrate the oscillation frequency of a voltage-controlled oscillator in the other clock and data recovery circuit, a calibration instruction signal is outputted to a calibrator in the other clock and data recovery circuit from the managing unit, whereby the oscillation frequency of the voltage-controlled oscillator is calibrated. By performing such calibration as needed, frequency changes caused by changes in temperature can be calibrated. Therefore, without providing a capacitive element for temperature compensation, the frequency characteristics of the voltage-controlled oscillator resulting from temperature change can be compensated for.

(6) Meanwhile, the present invention is directed to a frequency calibration method for a clock and data recovery circuit having a function of extracting a clock signal and a data signal from a received signal, and having a function of calibrating an oscillation frequency of a voltage-controlled oscillator by a calibrator, the frequency calibration method comprising:

(a) managing in advance a schedule for receiving signals by the clock and data recovery circuit;

(b) selecting a time where a duration of a certain state meets a time required for calibration by the calibrator, the state having no received signal from which a clock signal and a data signal are to be extracted; and (c) performing calibration of the voltage-controlled oscillator by the calibrator.

In the frequency calibration method such as that described above, when the duration of a state having no received signal from which a clock signal and a data signal are to be extracted (so to speak, a free time) is greater than or equal to the time required for calibration, the oscillation frequency of the voltage-controlled oscillator is calibrated. By performing such calibration as needed, frequency changes caused by changes in temperature can be calibrated. Therefore, without providing a capacitive element for temperature compensation, the frequency characteristics of the voltage-controlled oscillator resulting from temperature change can be compensated for.

MODE FOR CARRYING OUT THE INVENTION

<Overall Configuration of a PON System>

Figure 1:
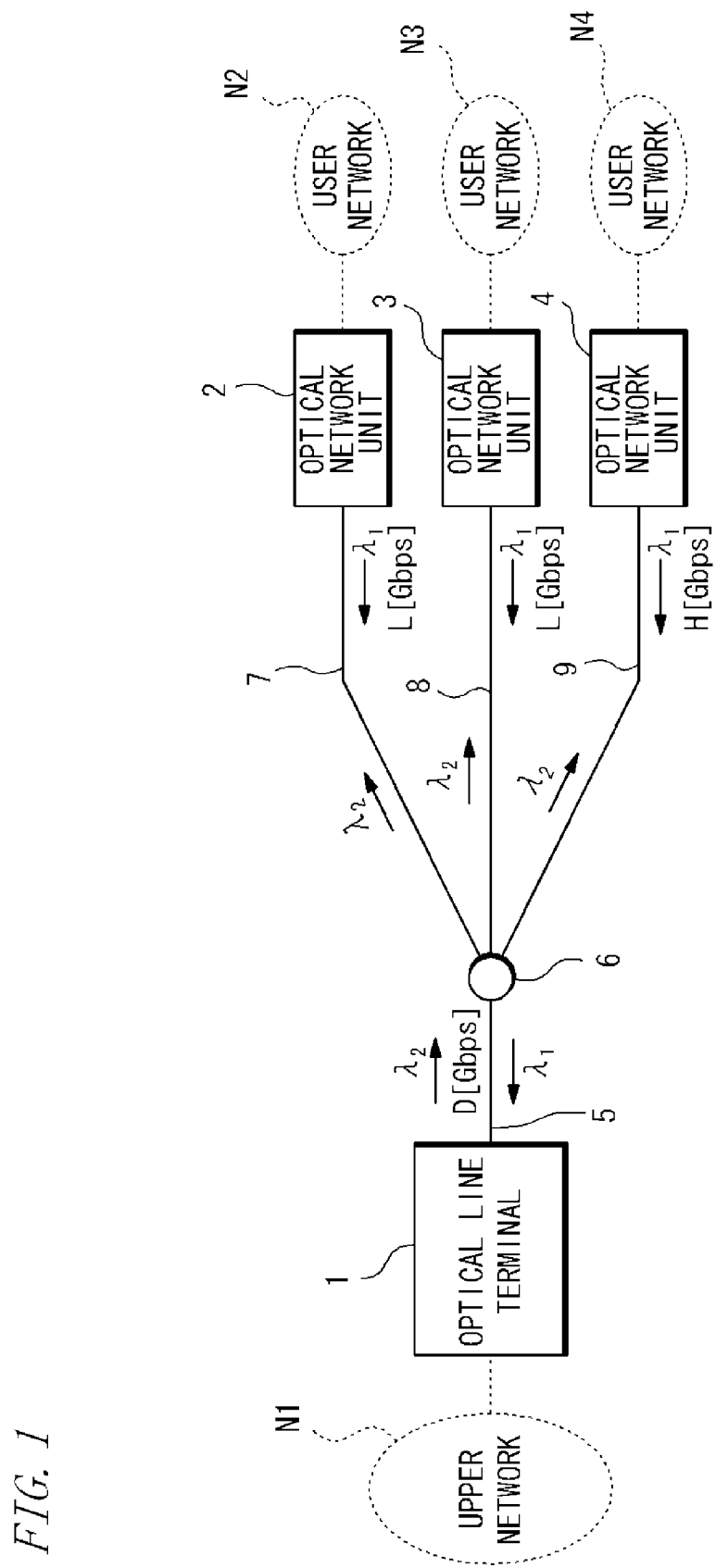
FIG. 1 is a connection diagram of a PON system including an optical line terminal according to an embodiment of the present invention.

FIG. 1 is a connection diagram of a PON system including an optical line terminal according to an embodiment of the present invention. In the drawing, an optical line terminal 1 is installed as a central office for a plurality of optical network units 2 to 4 connected thereto in a "one-to-multiple" relationship. The optical network units 2 to 4 are respectively installed in PON system subscribers' homes. In this system, a single optical fiber 5 (main line) connected to the optical line terminal 1 is split into a plurality of optical fibers (branch lines) 7 to 9 through an optical coupler 6, thereby forming an optical fiber network (5 to 9). The optical network units 2 to 4 are connected to the respective ends of the split optical fibers 7 to 9. Furthermore, the optical line terminal 1 is connected to an upper network N1, and the optical network units 2, 3, and 4 are connected to their respective user networks N2, N3, and N4.

Note that although FIG. 1 shows three optical network units 2 to 4, it is possible that, for example, 32 split optical fibers are obtained through a single optical coupler 6 to connect 32 optical network units. Note also that although in FIG. 1 only one optical coupler 6 is used, by providing a plurality of optical couplers longitudinally, more optical network units can be connected to the optical line terminal 1.

In FIG. 1, in an upstream direction from the optical network units 2 to 4 to the optical line terminal 1, data is transmitted at wavelength $\lambda_1$. On the other hand, in a downstream direction from the optical line terminal 1 to the optical network units 2 to 4, data is transmitted at wavelength $\lambda_2$. The wavelengths $\lambda_1$ and $\lambda_2$ can take any value in the following range, based on Clause 60 of IEEE Standard 802.3ah-2004:

1260 nm ≤ $\lambda_1$ ≤ 1360 nm
1480 nm ≤ $\lambda_2$ ≤ 1500 nm.

The transmission rates for communication in the upstream direction at the optical network units 2, 3, and 4 are L [Gbps], L [Gbps], and H [Gbps], respectively. Here, the values of L and H have the relationship L<H. For example, L=1 and H=10. Namely, this system is a multi-rate PON system where a plurality of types of transmission rates are used. On the other hand, the transmission rate for communication in the downstream direction at the optical line terminal 1 is of one type, D [Gbps]. The value of D is, for example, 1.

Note that although in this example three optical network units and two types of transmission rates are used, there can be various patterns of the number of optical network units and the number of different transmission rates.

<Configuration of the Optical Line Terminal>

Figure 2:
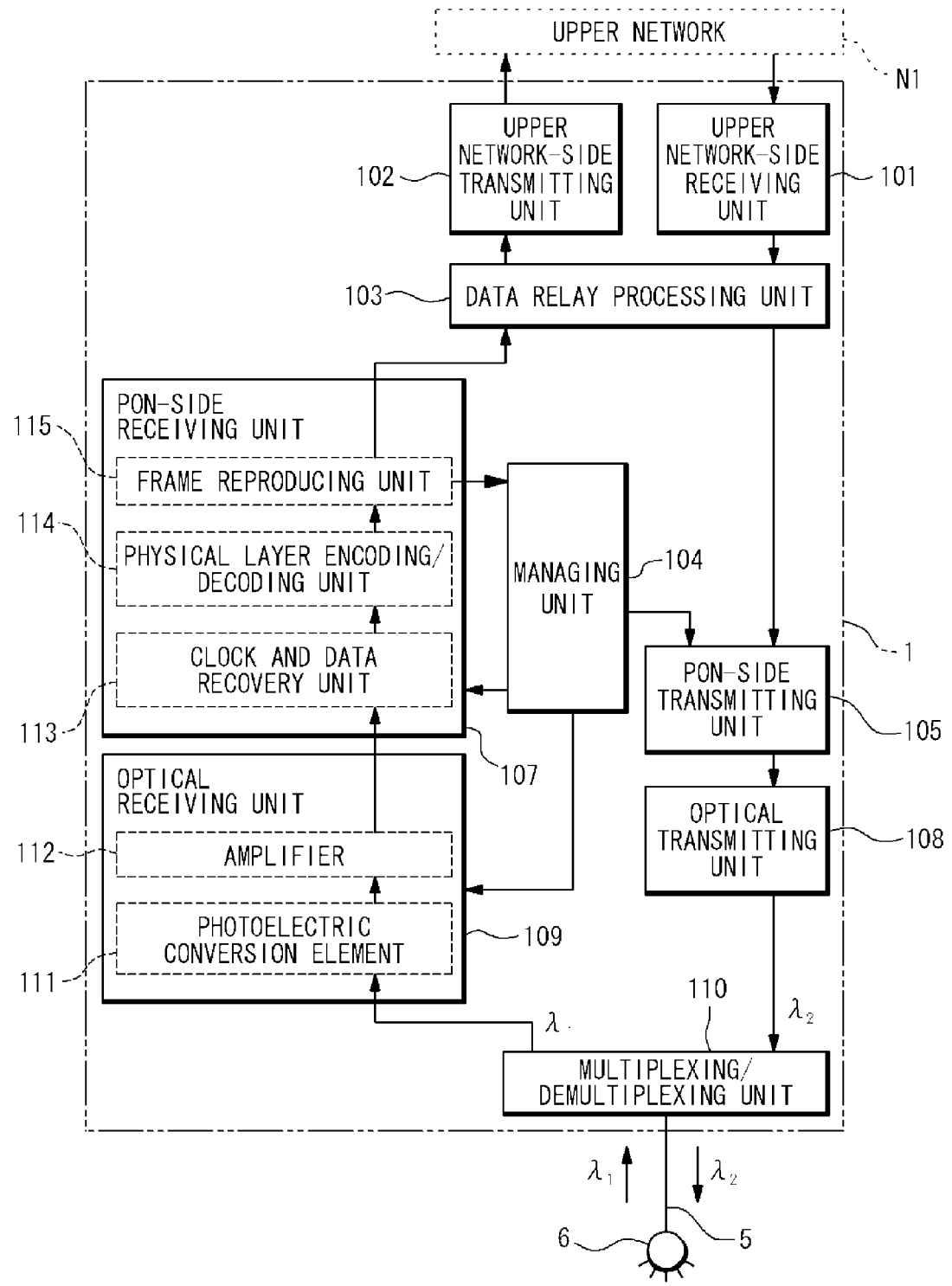
FIG. 2 is a block diagram showing an outline of the internal configuration of the optical line terminal in the PON system in FIG. 1.

FIG. 2 is a block diagram showing an outline of the internal configuration of the optical line terminal 1. The units (101 to 105 and 107 to 115) included in the optical line terminal 1 are connected in the manner shown in the drawing. In the drawing, a frame from the upper network N1 is received by an upper network-side receiving unit 101 and sent to a data relay processing unit 103. The data relay processing unit 103 passes the frame to a PON-side transmitting unit 105. The frame is converted by an optical transmitting unit 108 into an optical signal with wavelength $\lambda_2$ and transmission rate D [Gbps]. The optical signal is sent to the optical network units 2 to 4 through a multiplexing/demultiplexing unit 110.

Meanwhile, optical signals (wavelength $\lambda_1$ and transmission rates L and H [Gbps]) transmitted in the upstream direction from the optical network units 2 to 4 (FIG. 1) pass through the multiplexing/demultiplexing unit 110 and are received by an optical receiving unit 109. The optical receiving unit 109 includes therein a photoelectric conversion element 111 and an amplifier 112. The photoelectric conversion element 111 is a semiconductor light receiving element such as a photocliode or an avalanche photocliode, and outputs an electrical signal according to the amount of light received. The amplifier 112 amplifies and outputs the electrical signal. The output signal from the amplifier 112 is inputted to a PON-side receiving unit 107.

The PON-side receiving unit 107 includes therein a clock and data recovery unit 113, a physical layer encoding/decoding unit 114, and a frame reproducing unit 115. The clock and data recovery unit 113 extracts a timing component (clock signal) and a data signal in synchronization with the electrical signal received from the amplifier 112. The physical layer encoding/decoding unit 114 decodes code provided to the extracted data. The frame reproducing unit 115 detects frame boundaries from the decoded data to reconstruct, for example, Ethernet (registered trademark) frames. In addition, the frame reproducing unit 115 reads a header portion of a frame and thereby determines whether the received frame is a data frame or a frame of control information for media access control such as a report frame.

Note that an example of the control information includes an MPCP (Multi-point Control Protocol) PDU (Protocol Data Unit) described in Clause 64 of IEEE Standard 802.3ah-2004. Types of the MPCP PDU include a grant which is control information used to provide an instruction from the optical line terminal 1 to the optical network units 2 to 4 for the sending start time of data in the upstream direction and the allowed amount of sending; and a report which is control information used to provide notification of a value related to the amount of data in the upstream direction accumulated, from the optical network units 2 to 4 to the optical line terminal 1.

If, as a result of the above-described determination, the frame is a data frame, then the frame reproducing unit 115 sends the data frame to the data relay processing unit 103. The data relay processing unit 103 performs predetermined relay processes, including changing the header information of the data frame, performing transmission control on an upper network-side transmitting unit 102, etc. The processed frame is sent out to the upper network N1 from the upper network-side transmitting unit 102. If, as a result of the above-described determination, the frame is a report frame, then the frame reproducing unit 115 sends the report frame to a managing unit 104. The managing unit 104 generates, based on the report, a grant frame serving as control information. The grant frame is transmitted in the downstream direction at wavelength $\lambda_2$ and transmission rate D [Gbps] from the PON-side transmitting unit 105 and the optical transmitting unit 108 through the multiplexing/demultiplexing unit 110.

The managing unit 104 stores transmission rates used by the optical network units 2 to 4 and identifies, based on a grant, timing at which the next burst signal is received and a transmission rate of the burst signal. Namely, the managing unit 104 manages a schedule for receiving signals. Then, the identified transmission rate is notified to the optical receiving unit 109 and the PON-side receiving unit 107. The optical receiving unit 109 and the PON-side receiving unit 107 can allow the reception function to support the identified transmission rate in accordance with that timing.

Specifically, the reception function can be allowed to support a predetermined transmission rate by changing circuit parameters related to burst reception, such as the amplification factor of the photoelectric conversion element 111 in the optical receiving unit 109, the gain of the amplifier 112, a quantization determination threshold value in the PON-side receiving unit 107, and a lock tolerance and the frequency of a reference clock in the clock and data recovery unit 113. For example, in the case in which the optical network units 2 to 4 are connected under the same line condition (they have the same required optical power budget) and transmission quality with the same bit error rate needs to be satisfied, when reception is performed by the optical network unit 4 having a higher transmission rate than the optical network units 2 and 3, the gain of the optical receiving unit 109 is reduced to widen the frequency band.

In addition, for example, when the optical network units 2 (3) and 4 perform burst communication in the upstream direction at 1.25 Gbps and 10.3125 Gbps, respectively, if the clock and data recovery unit 113 is notified in advance that the transmission rates of the next bursts are 1 Gbps and 10 Gbps, respectively, then only fractional portions need to be adjusted. Thus, synchronization of the clock and data recovery unit 113 can be reliably established in a short time. Furthermore, when it is premised that physical layer encoding/decoding are performed for 1.25 Gbps and 10.3125 Gbps, using 8B/10B code and 64B/66B code, respectively, a decoding circuit to be used for the next burst can be easily and reliably selected.

<Configurations of the Optical Network Units>

Figure 3:
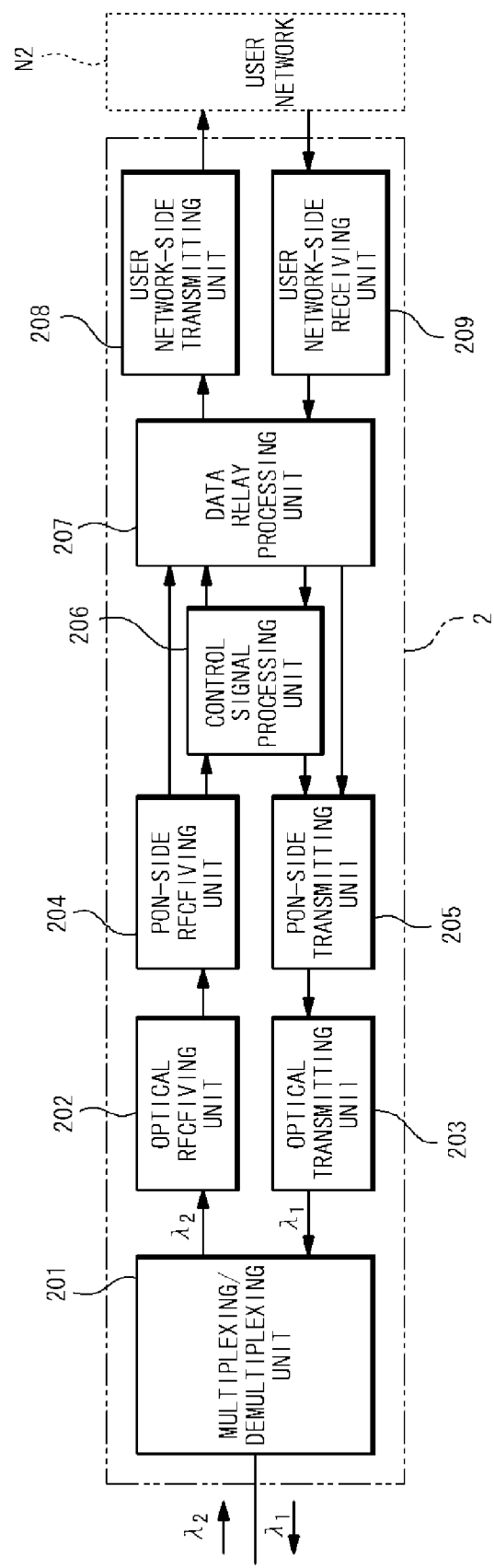
FIG. 3 is a block diagram showing an outline of the internal configuration of an optical network unit in the PON system in FIG. 1.

FIG. 3 is a block diagram showing an outline of the internal configuration of the optical network unit 2. The units (201 to 209) included in the optical network unit 2 are connected in the manner shown in the drawing. In FIG. 3, an optical signal transmitted in the downstream direction from the optical line terminal 1 (FIG. 1) passes through a multiplexing/demultiplexing unit 201 and is converted into an electrical signal by an optical receiving unit 202. The electrical signal is further received by a PON-side receiving unit 204.

The PON-side receiving unit 204 reads a header portion (including a preamble portion) of a received frame and thereby determines whether the frame is destined for the optical network unit 2 (here, it indicates that the frame is destined for the optical network unit 2 or an apparatus in the user network N2 under the optical network unit 2). If, as a result of the determination, the frame is destined for the optical network unit 2, then the frame is captured; otherwise, the frame is discarded. For example, an example of the header information for performing the above-described destination determination includes a Logical Link IDentifier (LLID) described in IEEE Standard 802.3ah-2004.

The PON-side receiving unit 204 further reads the header portion of the frame and thereby determines whether the received frame is a data frame or a grant frame. If, as a result of the determination, the frame is a data frame, then the PON-side receiving unit 204 sends the data frame to a data relay processing unit 207. The data relay processing unit 207 performs predetermined relay processes, including performing transmission control on a user network-side transmitting unit 208, etc. The processed frame is sent out to the user network N2 from the user network-side transmitting unit 208.

If, as a result of the above-described determination, the frame is a grant frame, then the PON-side receiving unit 204 transfers the grant frame to a control signal processing unit 206. The control signal processing unit 206 instructs, based on the grant frame, the data relay processing unit 207 to perform sending in the upstream direction.

Meanwhile, a frame from the user network N2 is received by a user network-side receiving unit 209 and is transferred to the data relay processing unit 207. The transferred frame is temporarily accumulated in a buffer memory in the data relay processing unit 207, and the amount of data in the frame is notified to the control signal processing unit 206. The control signal processing unit 206 performs transmission control on a PON-side transmitting unit 205 to allow the PON-side transmitting unit 205 to output, at predetermined timing, the frame accumulated in the buffer memory, and generates a report frame based on the notified amount of data accumulated in the buffer memory and allows the PON-side transmitting unit 205 to output the report frame. The outputs from the PON-side transmitting unit 205 are converted into optical signals by an optical transmitting unit 203. The optical signals are transmitted in the upstream direction through the multiplexing/demultiplexing unit 201 as a signal with wavelength $\lambda_1$ and transmission rate L [Gbps].

Note that the optical network unit 3 also has the same configuration as in FIG. 3.

Figure 4:
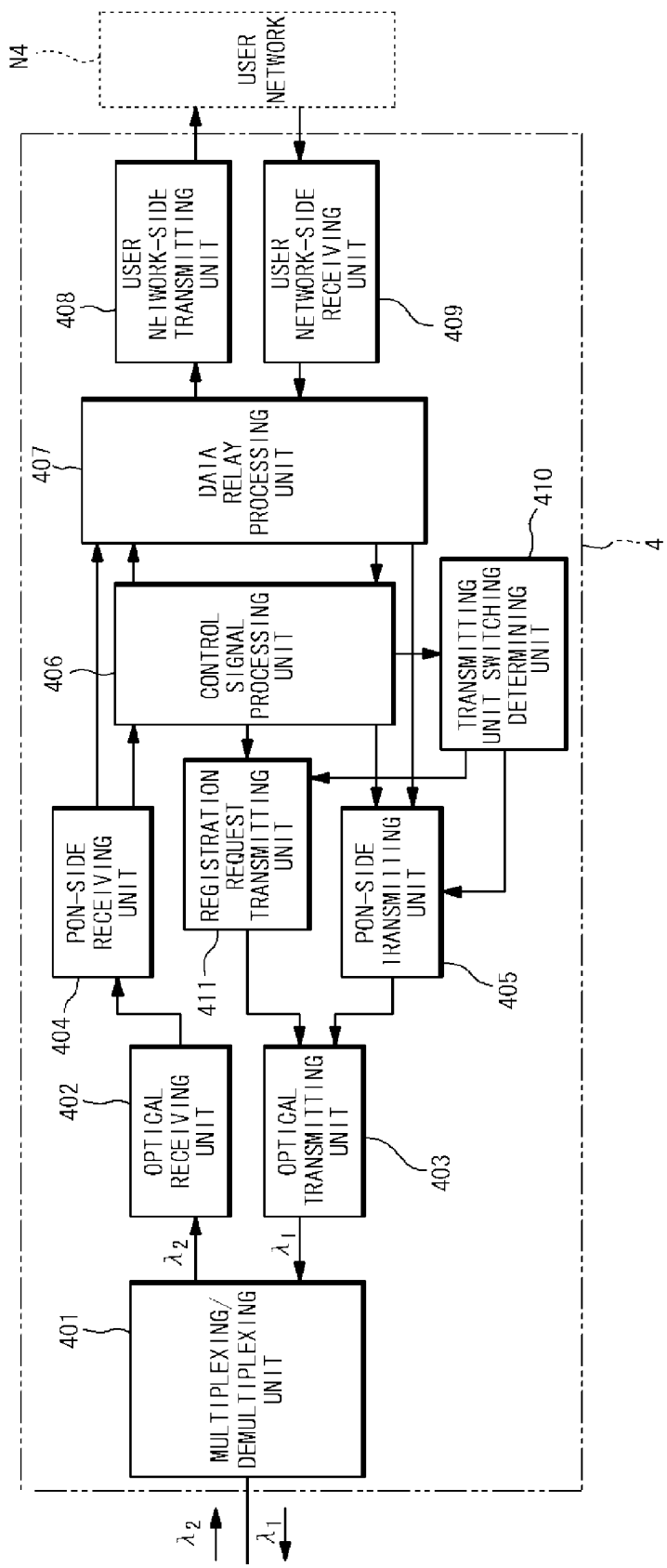
FIG. 4 is a block diagram showing an outline of the internal configuration of another optical network unit in the PON system in FIG. 1.

FIG. 4 is a block diagram showing an outline of the internal configuration of the optical network unit 4 (transmission rate H [Gbps]). The units (401 to 411) included in the optical network unit 4 are connected in the manner shown in the drawing. Of them, 401 to 409 denote circuit elements corresponding to 201 to 209 in FIG. 3 and have the same functions. The differences from FIG. 3 are that a registration request transmitting unit 411 is provided between a control signal processing unit 406 and an optical transmitting unit 403; switching between a PON-side transmitting unit 405 and the registration request transmitting unit 411 can be performed by a transmitting unit switching determining unit 410; and the transmitting unit switching determining unit 410 performs transmitting unit switching in response to an instruction from the control signal processing unit 406. Normally, as a transmitting unit, the PON-side transmitting unit 405 operates. Note that the optical network unit 4 with the PON-side transmitting unit 405 operating is substantially the same as the optical network unit 2.

<Basic Operation Sequence of the PON System>

Next, the operation procedure of the PON system configured in the above-described manner will be described with reference to a sequence diagram of FIG. 5. Note that although the sequence diagram shows operations performed between the optical line terminal 1 and the optical network unit 2, the same also applies to other optical network units 3 and 4.

Figure 5:
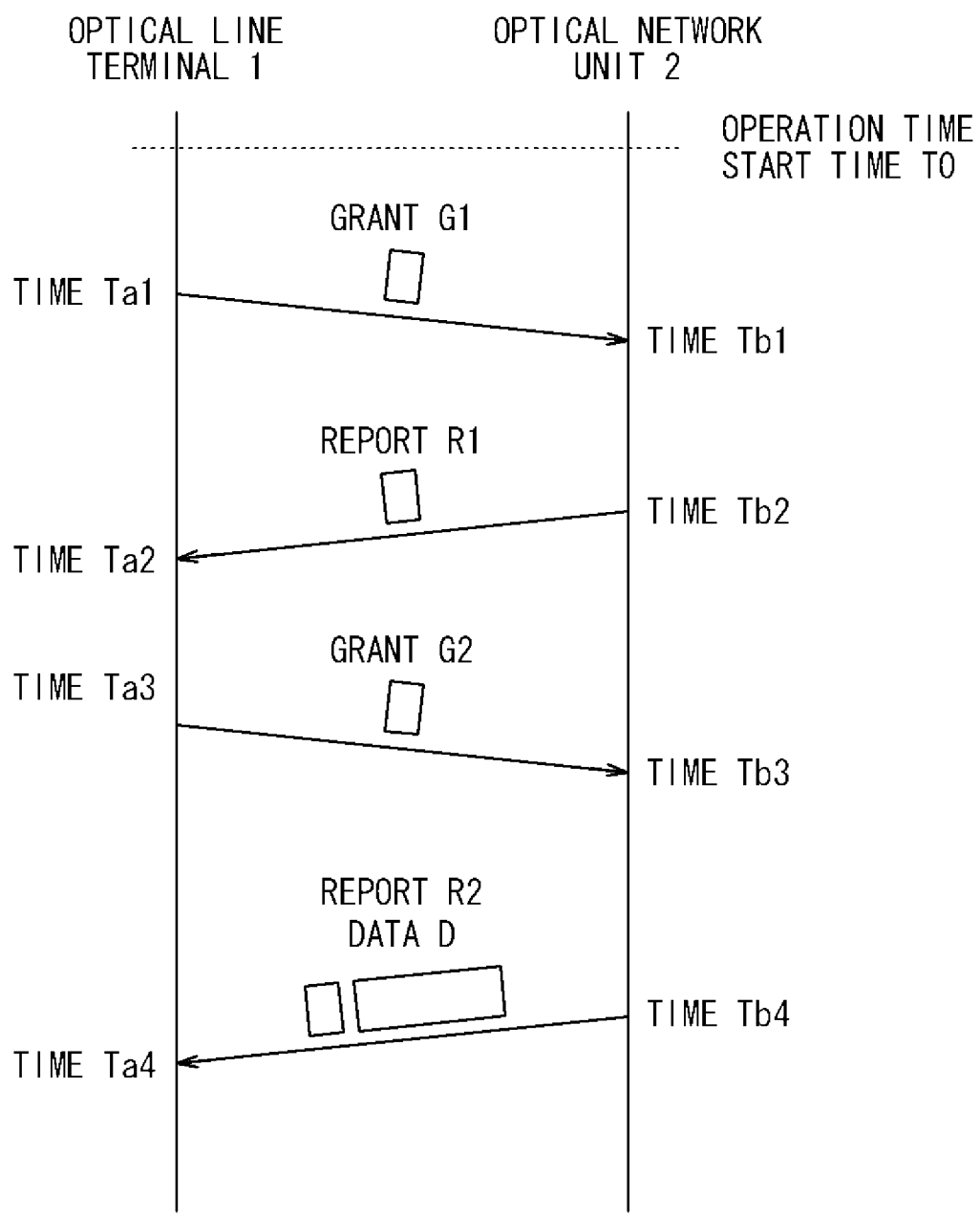
FIG. 5 is a sequence diagram showing operations performed between the optical line terminal and an optical network unit.

In FIG. 5, the optical line terminal 1 has already computed RTT (Round Trip Time) for the optical network unit 2 at the time of operation time start time T0. At time Ta1, the optical line terminal 1 transmits a grant (grant frame) G1 including report sending start time Tb2, to the optical network unit 2 to allow the optical network unit 2 to notify of an amount of sending required. The report sending start time Tb2 is computed such that a report does not collide with reports transmitted from other optical network units 3 and 4.

When the optical network unit 2 receives the grant G1 intended therefor, the optical network unit 2 calculates an amount of sending required, by referring to the amount of data accumulated in the buffer memory in the data relay processing unit 207, and sends out a report (report frame) R1 including the amount of sending required, to the optical line terminal 1 at report sending start time Tb2 which is included in the grant G1.

When the optical line terminal 1 receives the report R1, the optical line terminal 1 computes a value that is less than or equal to a fixed or variable maximum allowed amount of sending and that allows as much data as possible to be sent from the amount of data in the buffer memory which is included in the report R1, and inserts a computation result in a grant G2 as the allowed amount of sending. When the amount of sending required which is included in the report R1 is zero, a computation result obtained by the optical line terminal 1 is zero and thus a frequency band is not allocated. However, since there is a need to allow the optical network unit 2 to send out a report R2, the optical line terminal 1 always sends out a grant G2 to the optical network unit 2.

Sending start time Tb4 included in the grant G2 is computed using the last schedule time to receive optical network unit data, the last allowed amount of sending for the optical network unit 2, and the current RTT for the optical network unit 2 which are already computed and a guard time which is a fixed time, such that data and a report do not collide with data or reports from other optical network units 3 and 4. Note that the optical line terminal 1 computes time Ta3 at which the grant G2 including the allowed amount of sending and the sending start time Tb4 is sent out, such that the grant G2 arrives at the optical network unit 2 before sending start time Tb4.

When the optical network unit 2 receives the grant G2 intended therefor, the optical network unit 2 sends out data D, the amount of which corresponds to the allowed amount of sending, together with a report R2 including the next amount of sending required, to the optical line terminal 1 at sending start time Tb4 which is included in the grant G2. The report R2 is sent out immediately before or immediately after the data D. When the report R2 is sent out immediately before the data D, a value reported to the optical line terminal 1 as the amount of sending required is the difference between the amount of data accumulated in the buffer memory and the amount of the data D.

When the optical line terminal 1 receives the data D and the report R2, the optical line terminal 1 sends out the data D to the upper network N1 and performs, for the report R2, the same process as that performed on the report R1. The above-described sequence processes are independently performed on all the optical network units 2 to 4. The processes performed at times Ta3 to Ta4 are repeated until the operation time ends.

Figure 6:
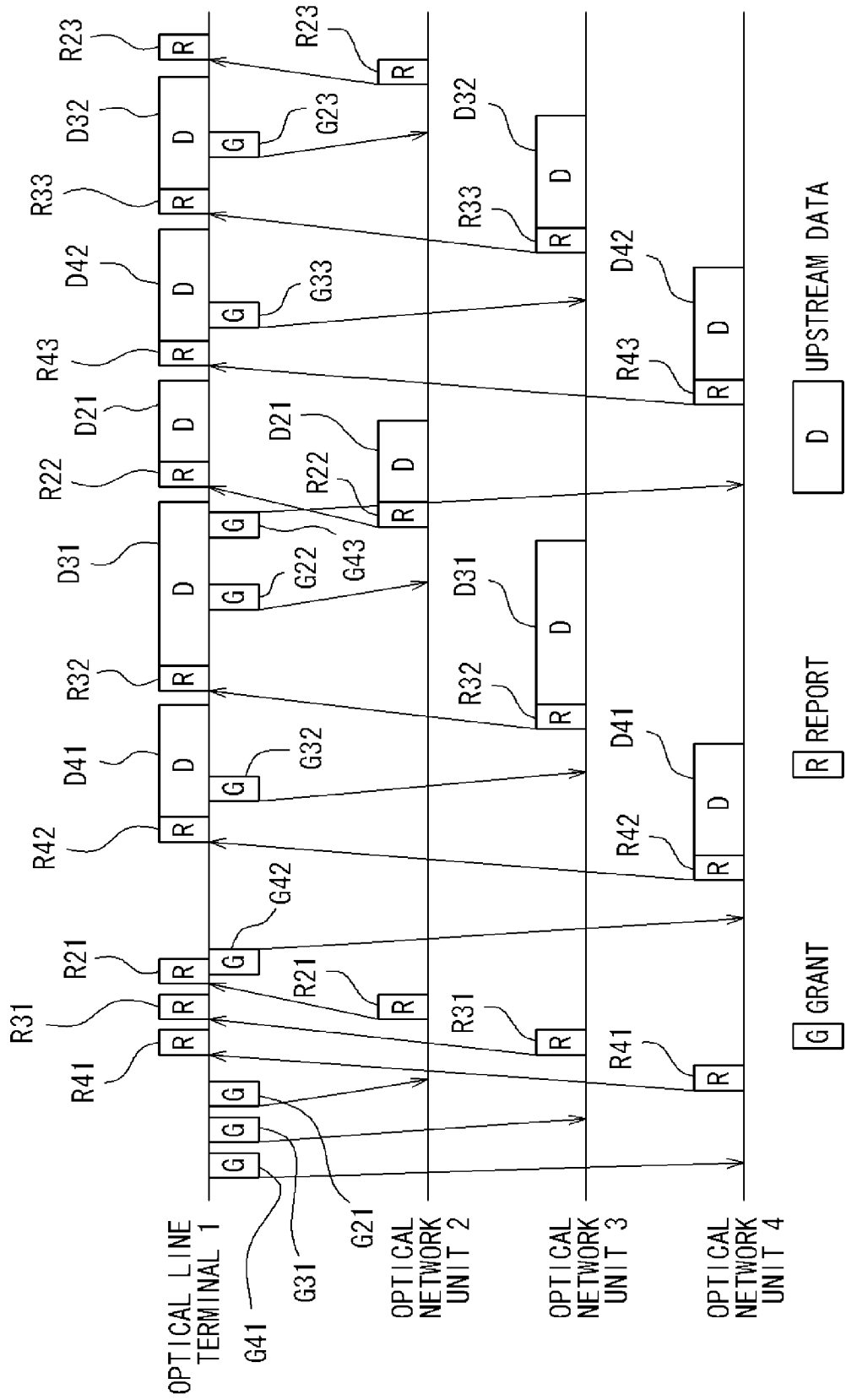
FIG. 6 is a sequence diagram showing frequency band allocation to optical network units, and transmission and reception for communication in an upstream direction performed between the optical line terminal and the optical network units.

FIG. 6 is a sequence diagram showing frequency band allocation to the optical network units 2 to 4, and transmission and reception for communication in the upstream direction performed between the optical line terminal 1 and the optical network units 2 to 4, and showing an example of a distribution allocation scheme. Assuming that time proceeds from the left to the right in the drawing, the operation of the system with the optical line terminal 1 being the subject will be described.

First, the optical line terminal 1 sequentially sends out grants G41, G31, and G21 to the optical network units 4, 3, and 2, respectively. Then, when the optical line terminal 1 receives reports R41, R31, and R21 from the optical network units 4, 3, and 2, respectively, the optical line terminal 1 sends out a grant G42 for the optical network unit 4 that is the first one to be allowed to send out data.

The optical line terminal 1 receives data D41 and a next report R42 sent out from the optical network unit 4, and at the same time, sends out a grant G32 for the optical network unit 3. The optical line terminal 1 receives data D31 and a next report R32 sent out from the optical network unit 3, and at the same time, sends out a grant G22 for the optical network unit 2. Subsequently, the optical line terminal 1 also sends out a grant G43 for the optical network unit 4.

The optical line terminal 1 receives data D21 and a next report R22 sent out from the optical network unit 2. In addition, the optical line terminal 1 receives data D42 and a next report R43 sent out from the optical network unit 4, and at the same time, sends out a grant G33 for the optical network unit 3. Furthermore, the optical line terminal 1 receives data D32 and a next report R33 sent out from the optical network unit 3, and at the same time, sends out a grant G23 for the optical network unit 2. Here, if there is no data to be sent out from the optical network unit 2, then the optical line terminal 1 receives only a next report R23. After this, the same processes are repeated, and the optical line terminal 1 sequentially allocates frequency bands to the optical network units 2 to 4 and repeats data reception.

According to the sequence shown in FIG. 6, the waiting time from when data sent out from the user networks N2, N3, and N4 (FIG. 1) arrives at the corresponding optical network units 2 to 4 until the data is sent out therefrom depends on the time required from when reports are sent out by the optical network units 2 to 4 until data associated with the reports is sent out. Namely, the waiting time changes depending on the amount of data sent out from all the optical network units 2 to 4.

For example, when the amounts of sending required which are notified by reports from the optical network units 2 to 4 are all allowed, the waiting time from when the reports are sent out until data is sent out significantly increases. This not only affects those services that require real-time processing, but also greatly affects TCP (Transmission Control Protocol) throughput. Therefore, the optical line terminal 1 needs to control the amount of data sent out from the optical network units 2 to 4 such that the waiting time in the buffer in each optical network unit is kept within the allowed time.

In the above-described sequence (FIG. 6), for example, when a grant G42 is sent out to the optical network unit 4, the managing unit 104 in FIG. 2 notifies, based on the grant G42, the optical receiving unit 109 and the PON-side receiving unit 107 of the transmission rate H (10 Gbps) of the next burst to be received (report R42+data D41), during a gap period between bursts before receiving the report R42. The optical receiving unit 109 and the PON-side receiving unit 107 having received the notification allow the reception function to support 10 Gbps, and wait for the burst. Accordingly, when the burst arrives, the optical line terminal 1 is prepared for reception that supports transmission rate H, enabling to establish synchronization extremely rapidly.

Likewise, when a grant G32 is sent out to the optical network unit 3, the managing unit 104 notifies the optical receiving unit 109 and the PON-side receiving unit 107 of the transmission rate L (1 Gbps) of the next burst to be received (report R32+data D31), during a gap period between bursts between the data D41 and the report R32. The optical receiving unit 109 and the PON-side receiving unit 107 having received the notification allow the reception function to support 1 Gbps, and wait for the burst. Accordingly, when the burst arrives, the optical line terminal 1 is prepared for reception that supports transmission rate L, enabling to establish synchronization extremely rapidly. In subsequent processes, likewise, rapid synchronization establishment can be performed, enabling to increase the efficiency of communication in the upstream direction.

In the above-described manner, the optical line terminal 1 can obtain, based on grants provided to the optical network units 2 to 4, information about timing at which the next signal in the upstream direction is received and about a transmission rate of the signal, before actually receiving the signal. In addition, by receiving the signal in a state in which the reception function supports the transmission rate, synchronization can be established rapidly. Accordingly, synchronization is easily and rapidly established with a transmission rate for communication in the upstream direction, enabling to increase the efficiency of communication in the upstream direction.

<Discovery Process>

Note that although in the above description the optical network units 2 to 4 have already subscribed to the PON system, in practice, there is a procedure in which an optical network unit in a power-off state where the optical network unit is not recognized by the optical line terminal 1, is turned on and is thereby recognized by the optical line terminal 1, subscribing to the PON system. This procedure is called a discovery process and is defined in Clause 64 of IEEE Standard 802.3ah-2004. The discovery process will be described below.

In the first place, an optical network unit before being recognized by the optical line terminal 1 does not have an opportunity to be provided a grant. Meanwhile, all optical network units cannot perform communication in the upstream direction unless the optical network units are explicitly provided grants from the optical line terminal 1. Hence, the optical line terminal 1 periodically performs a discovery process to detect an optical network unit that transitions from a power off (including an unconnected state) to a power on and attempts to subscribe to the PON system (hereinafter, referred to as the unregistered optical network unit), and thereby provides a response opportunity to the unregistered optical network unit.

Figure 7:
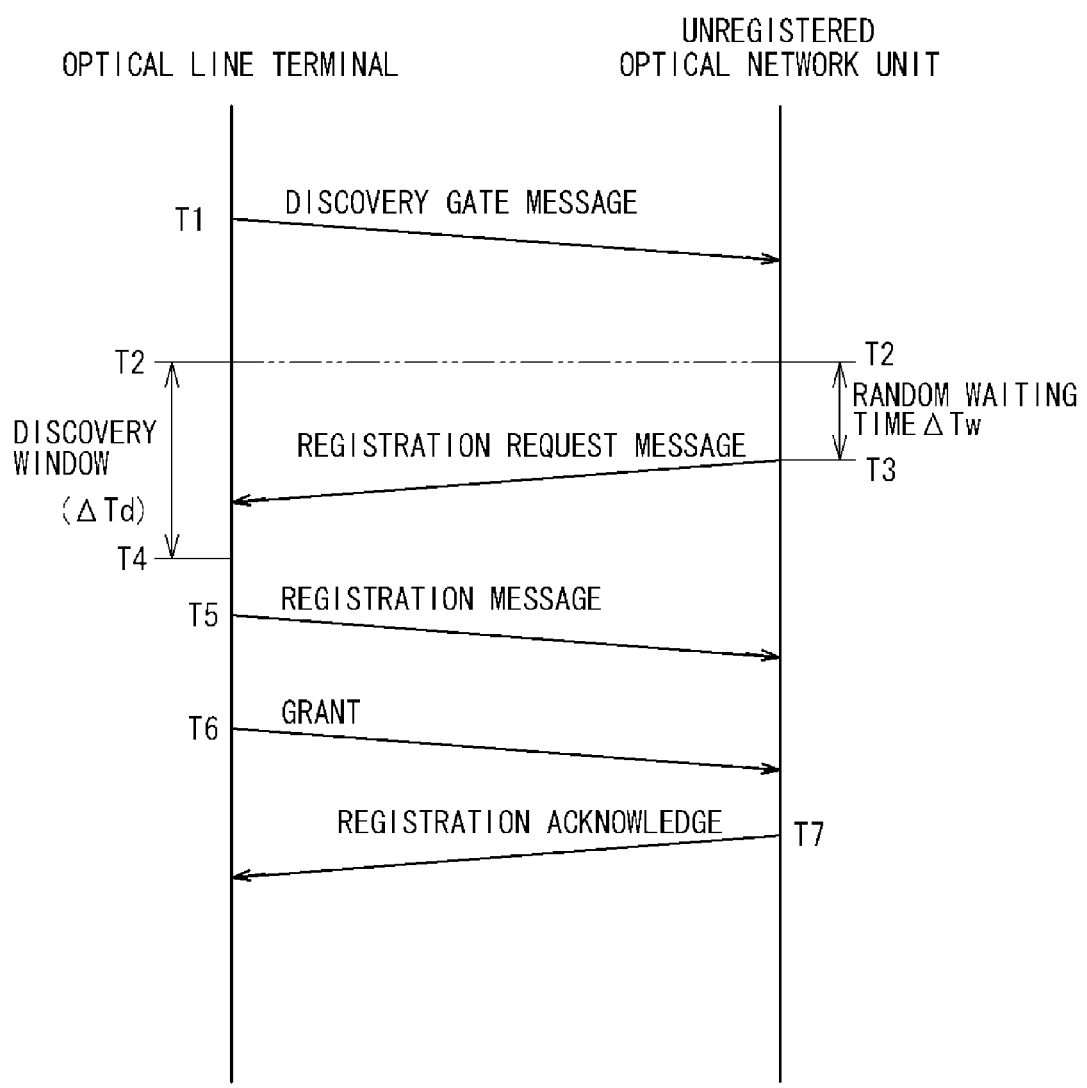
FIG. 7 is a diagram showing a discovery process performed between an optical line terminal and an unregistered optical network unit.

FIG. 7 is a diagram showing a discovery process performed between an optical line terminal and an unregistered optical network unit. In the drawing, the optical line terminal starts a discovery process at time T1 and broadcasts a discovery gate message in the downstream direction. The discovery gate message includes information about the start time for a discovery period during which a response to the discovery gate message is allowed, and the length of the period. The discovery period is called a discovery window and is, for example, a time period ΔTd from times T2 to T4.

The unregistered optical network unit having received the discovery gate message waits a random waiting time ΔTw having time with a random length from time T2 (at which the unregistered optical network unit is synchronized with the optical line terminal), and transmits, at time T3, a registration request message to the optical line terminal. The random waiting time ΔTw takes a random value in a range in which the registration request message can be delivered within the discovery window. Thus, even if there are a plurality of unregistered optical network units attempting to subscribe to the PON system, the probability that registration request messages from the plurality of unregistered optical network units collide with each other can be reduced.

The registration request message includes a MAC address serving as an individual identification number of the unregistered optical network unit. The optical line terminal having succeeded in receiving the registration request message assigns a logical link number (LLID) in the PON system to the unregistered optical network unit, and registers the unregistered optical network unit in the PON system such that the MAC address and the LLID are associated with each other. Then, the optical line terminal transmits, at time T5, a registration message to the newly registered optical network unit. The registration message includes the LLID of the optical network unit and information about synchronization time which is required when the optical line terminal receives burst communication in the upstream direction.

Thereafter, at time T6, the optical line terminal transmits a grant (grant gate message) allowing for communication in the upstream direction, to the optical network unit. The unregistered optical network unit having received the grant transmits, at time T7, a registration acknowledge to the optical line terminal using the grant. The optical line terminal receives the registration acknowledge, whereby the discovery process ends. Thereafter, normal PON system communication starts.

In the configuration of the PON system shown in FIG. 1, if, for example, the above-described discovery process is performed on all the optical network units 2 to 4, then the optical line terminal 1 needs to receive registration request messages from the respective optical network units 2 to 4. In normal PON communication performed after the optical network units 2 to 4 have subscribed to the PON system, as described previously, the optical line terminal 1 can be prepared for reception (the reception function is allowed to support a certain transmission rate) based on a grant; however, this cannot be done at an unregistered stage. Hence, the optical line terminal 1 receives communication in the upstream direction (registration request messages) from unregistered optical network units, for example, in the following manner.

Namely, even though the optical network units 2 to 4 have different transmission rates for normal PON communication, by using one type of transmission rate (typically, L) for a registration request message, the transmission rate is known before reception.

Specifically, the optical network unit 2 with transmission rate L transmits a registration request message at transmission rate L as does when performing normal PON communication. On the other hand, when the optical network unit 4 with transmission rate H shown in FIG. 4 receives a discovery gate message, the optical network unit 4 sends the discovery gate message to the transmitting unit switching determining unit 410 from the control signal processing unit 406. By this, the transmitting unit switching determining unit 410 switches the transmission function from the PON-side transmitting unit 405 to the registration request transmitting unit 411. Then, the control signal processing unit 406 allows a registration request message to be transmitted from the registration request transmitting unit 411 at transmission rate L.

Therefore, the optical network unit 4 using transmission rate H for normal PON communication performs transmission at transmission rate L for a registration request message. Note that after transmitting the registration request message, the transmitting unit switching determining unit 410 switches back the transmission function from the registration request transmitting unit 411 to the PON-side transmitting unit 405.

As a result, registration request messages delivered to the optical line terminal 1 from the unregistered optical network units 2 to 4 within a discovery window period (when two or three optical network units are simultaneously turned on, registration request messages are delivered randomly one after the other within the same period) are all sent at transmission rate L. Meanwhile, the managing unit 104 of the optical line terminal 1 notifies the optical receiving unit 109 and the PON-side receiving unit 107 of the transmission rate L of the next burst (registration request message) to be received in response to the discovery gate message. The optical receiving unit 109 and the PON-side receiving unit 107 having received the notification allow the reception function to support transmission rate L, and wait for a registration request message.

Accordingly, when a registration request message arrives, the optical line terminal 1 is prepared for reception that supports the transmission rate L thereof, enabling to rapidly and reliably receive registration request messages from the unregistered optical network units 2 to 4.

Note that, for a registration acknowledge, as in the case of normal PON communication, the reception function of the optical line terminal 1 can be allowed to support a transmission rate based on a grant provided to the optical network units 2 to 4 before the registration acknowledge.

<Configuration of the Clock and Data Recovery Unit in the Optical Line Terminal>

Next, a relationship between the configuration of the clock and data recovery unit 113 and the managing unit 104 in the optical line terminal 1 in FIG. 2 will be described in more detail.

Figure 8:
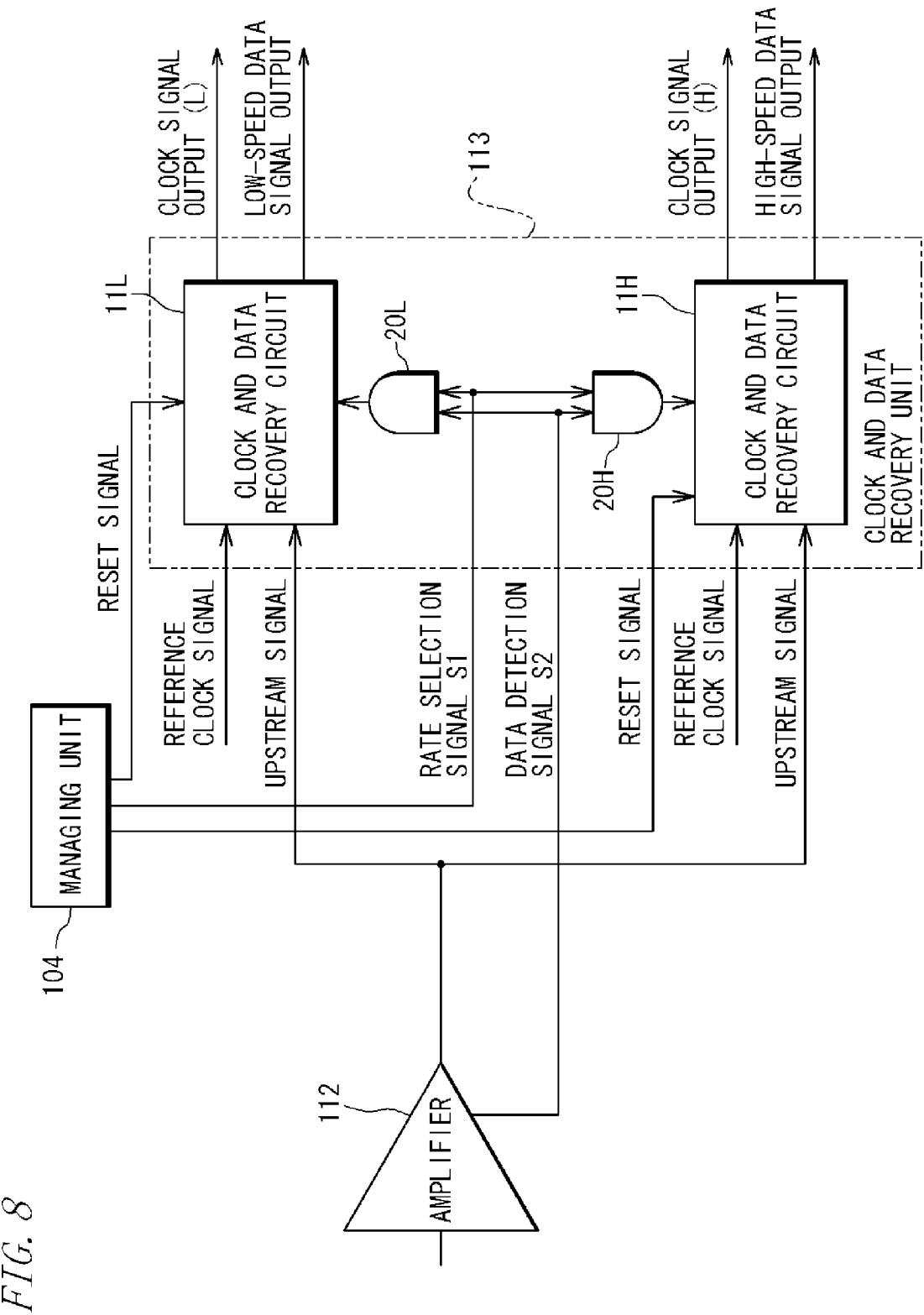
FIG. 8 is a block diagram showing an example of the circuit configuration of a clock and data recovery unit.

FIG. 8 is a block diagram showing an example of the circuit configuration of the clock and data recovery unit 113 (note that in this drawing, for convenience sake, the signal flow is reversed left and right from that in FIG. 2). In the drawing, the recovery unit 113 includes a plurality of clock and data recovery circuits 11L and 11H that support a plurality of types of transmission rates for the upstream direction and extract clock signals and data signals from upstream signals with the respective transmission rates. Specifically, in this example, there are provided the clock and data recovery circuit 11L for low-speed transmission rate L [Gbps] and the clock and data recovery circuit 11H for high-speed transmission rate H [Gbps]. In addition, AND circuits 20L and 20E1 are connected to the clock and data recovery circuits 11L and 11H, respectively.

To the AND circuits 20L and 20H are inputted a rate selection signal (a signal indicating a transmission rate to be selected) S1 from the managing unit 104 and a data detection signal (a signal indicating detection of a data signal) S2 from the amplifier 112. Therefore, in the AND circuit 20L, when an instruction to select low-speed transmission rate L is received from the managing unit 104 and a data signal is detected, an output logic holds true. In the AND circuit 20H, when an instruction to select high-speed transmission rate H is received from the managing unit 104 and a data signal is detected, an output logic holds true.

To each of the clock and data recovery circuits 11L and 11H are inputted a reset signal (calibration instruction signal) from the managing unit 104, a reference clock signal from a crystal oscillator (not shown), and an upstream signal from the amplifier 112. The clock and data recovery circuit 11L outputs a clock signal (low speed) and a low-speed data signal which are extracted from the upstream signal. The clock and data recovery circuit 11H outputs a clock signal (high speed) and a high-speed data signal which are extracted from the upstream signal.

Note that the managing unit 104 configures, together with the clock and data recovery circuits 11L and 11H, a "receiving unit" according to an embodiment of the present invention, including a calibrator which will be described later.

<Configuration of the Clock and Data Recovery Circuits>

Figure 9:
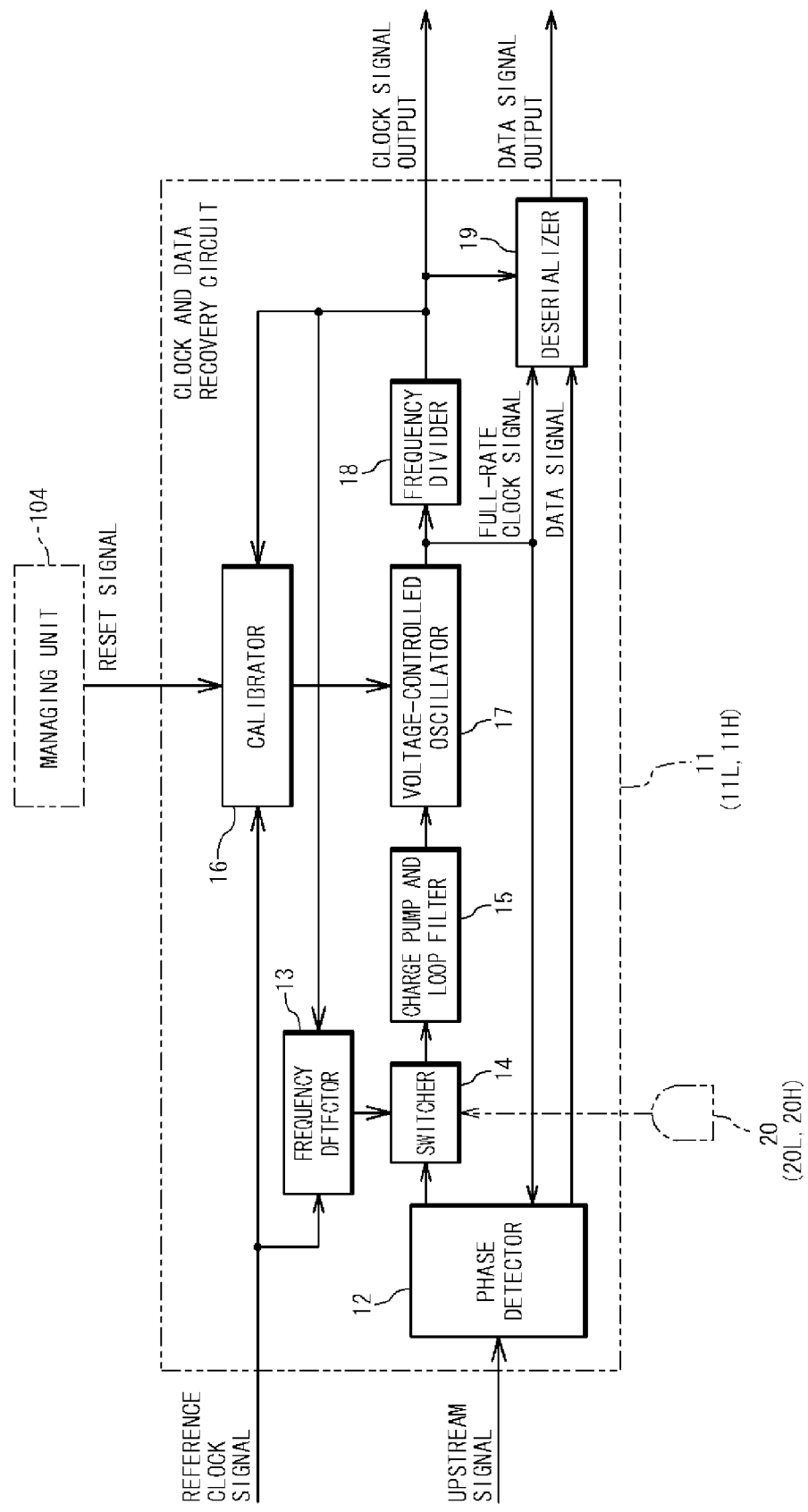
FIG. 9 is a block diagram showing the internal configuration of a clock and data recovery circuit.

FIG. 9 is a block diagram showing an internal configuration of a clock and data recovery circuit 11 (the collective reference numeral for 11L and 11H). The clock and data recovery circuit 11 extracts a clock signal and a data signal by a phase-lock scheme and includes, in order from the front stage side (the left side in FIG. 9) to the rear stage side (the right side in FIG. 9), a phase detector 12, a frequency detector 13, a switcher 14, a charge pump and a loop filter (hereinafter, simply referred to as the loop filter) 15, a calibrator 16, a voltage-controlled oscillator (VCO or VCXO) 17, a frequency divider 18, and a deserializer 19.

The switcher 14 has the function of alternatively allowing two inputs from the phase detector 12 and the frequency detector 13 to pass therethrough, according to an output from an AND circuit 20 (the collective reference numeral for 20L and 20H). Specifically, when there is an output from the AND circuit 20, the switcher 14 allows a signal to pass from the phase detector 12 to the loop filter 15. When there is no output from the AND circuit 20, the switcher 14 allows a signal to pass from the frequency detector 13 to the loop filter 15.

An upstream signal from the amplifier 112 (FIG. 8) is inputted to the phase detector 12 in the clock and data recovery circuit 11. When there is an output from the AND circuit 20, a phase-locked loop is configured which begins with the phase detector 12 and goes through the switcher 14, the loop filter 15, and the voltage-controlled oscillator 17 and then back to the phase detector 12. By this loop, the voltage-controlled oscillator 17 allows the phase of an output to be synchronized with that of the upstream signal.

Meanwhile, a reference clock signal is inputted to the frequency detector 13. When there is no output from the AND circuit 20, a frequency-locked loop is configured which begins with the frequency detector 13 and goes through the switcher 14, the loop filter 15, the voltage-controlled oscillator 17, and the frequency divider 18 and then back to the frequency detector 13. By this loop, the voltage-controlled oscillator 17 allows its oscillation frequency to be synchronized with that of the reference clock.

Specifically, in the low-speed clock and data recovery circuit 11L, the rate selection signal S1 is set to low speed, and when a data detection signal S2 is activated a phase-locked loop is formed, and at other times than that a frequency-locked loop is formed. On the other hand, in the high-speed clock and data recovery circuit 11H, the rate selection signal S1 is set to high speed, and when a data detection signal S2 is activated a phase-locked loop is formed, and at other times than that a frequency-locked loop is formed.

Hence, when the transmission rate of an upstream signal inputted from the amplifier 112 (FIG. 8) is at low speed L, a phase-locked loop in the low-speed clock and data recovery circuit 11L operates, and recovery of a clock signal and a data signal is performed at the low-speed transmission rate L. At this time, the high-speed clock and data recovery circuit 11H has a frequency-locked loop and thus allows its oscillation frequency to be synchronized with the reference clock. On the other hand, when the transmission rate of an upstream signal inputted from the amplifier 112 is at high speed H, a phase-locked loop in the high-speed clock and data recovery circuit 11H operates, and recovery of a clock signal and a data signal is performed at the high-speed transmission rate H. At this time, the low-speed clock and data recovery circuit 11L has a frequency-locked loop and thus allows its oscillation frequency to be synchronized with the reference clock.

In this manner, in the clock and data recovery unit 113 (FIG. 8), the AND circuits 20L and 20E1 allow the clock and data recovery circuits 11L and 11H to operate based on a rate selection signal S1 generated by the managing unit 104. Thus, switching between transmission rates can be rapidly performed. Then, since the rate selection signal S1 is a signal generated by the managing unit 104 using a grant, a circuit that determines a transmission rate of an upstream signal received by the optical line terminal 1 does not need to be separately provided, simplifying the circuit configuration.

Returning to FIG. 9, the deserializer 19 converts data extracted by the corresponding clock and data recovery circuit 11L, 11H, into a parallel signal and outputs the parallel signal. To the deserializer 19 are inputted a data signal (serial) outputted from the phase detector 12, a full-rate clock signal outputted from the voltage-controlled oscillator 17, and a frequency-divided clock signal obtained by frequency-dividing the clock signal by the frequency divider 18. Note that the deserializer is a known circuit and thus a detailed description thereof is omitted here.

As such, by incorporating the deserializer 19 that converts extracted data into a parallel signal and outputs the parallel signal, a low-speed parallel signal instead of a high-speed serial signal is transmitted to a circuit block (see FIG. 2)

subsequent to the clock and data recovery unit 113 (FIG. 8). Hence, the subsequent circuit block does not need to perform clock and data recovery again, enabling to reduce the burden on the subsequent circuit block.

<Voltage-Controlled Oscillator and Calibrator Therefor>

Next, the voltage-controlled oscillator 17 and the calibrator 16 that calibrates the oscillation frequency of the voltage-controlled oscillator 17 will be described. A full-rate clock signal outputted from the voltage-controlled oscillator 17 is frequency-divided by the frequency divider 18, resulting in a frequency-divided clock signal. Based on the frequency-divided clock signal and a reference clock signal, the calibrator 16 can output a frequency calibration signal for the voltage-controlled oscillator 17.

Figure 10:
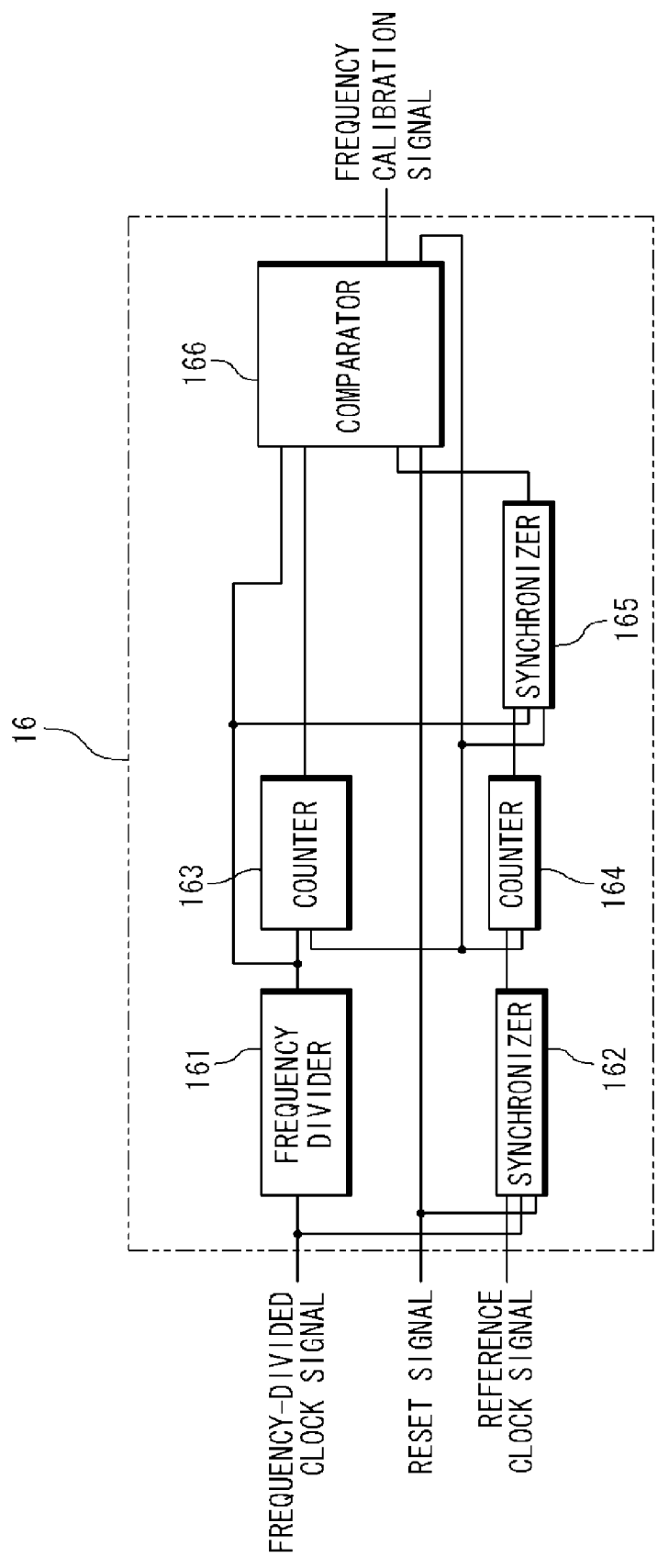
FIG. 10 is a block diagram showing the internal configuration of a calibrator.

FIG. 10 is a block diagram showing the internal configuration of the calibrator 16. In the drawing, the calibrator 16 is configured such that a frequency divider 161, a synchronizer 162, counters 163 and 164, a synchronizer 165, and a comparator 166 are connected to one another in the manner shown in the drawing. The frequency divider 161 obtains a clock signal obtained by further frequency-dividing an inputted frequency-divided clock signal. The counters 163 and 164 count rising edges of the clock signal outputted from the frequency divider 161 or a reference clock signal. The count value is reset by a reset signal from the comparator 166.

The synchronizer 162 allows the reference clock signal and the frequency-divided clock signal inputted to the calibrator 16 to be synchronized with each other. The synchronizer 162 is reset by a reset signal from the managing unit 104 (FIG. 8). The synchronizer 165 allows the count result of the reference clock signal to be synchronized with the clock signal outputted from the frequency divider 161. The comparator 166 compares the reference clock signal with the clock signal outputted from the frequency divider 161 to determine a frequency calibration signal to be provided to the voltage-controlled oscillator 17.

Figure 11:
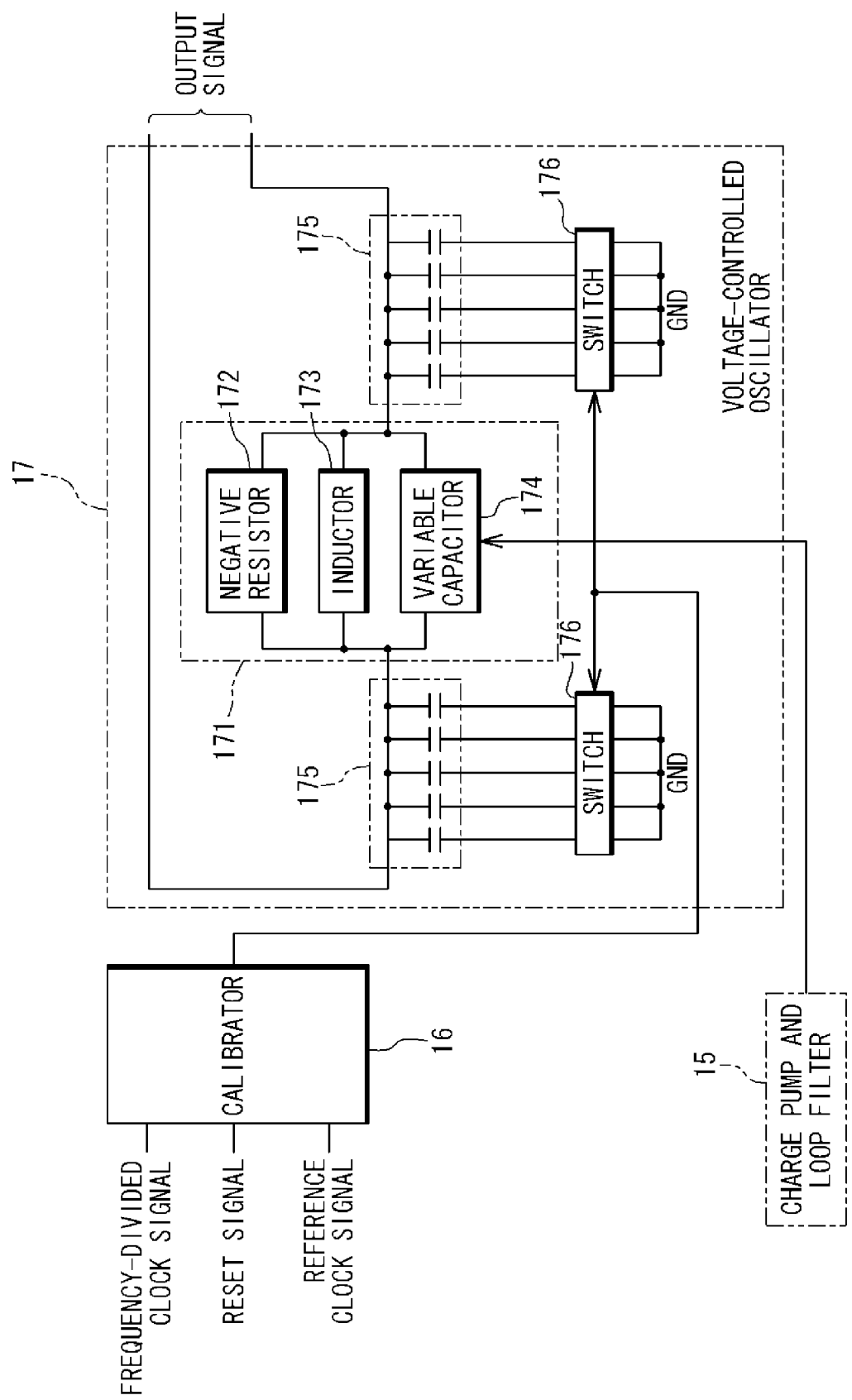
FIG. 11 is a circuit diagram showing the internal configuration of a voltage-controlled oscillator.

FIG. 11 is a circuit diagram showing the internal configuration of the voltage-controlled oscillator 17. The voltage-controlled oscillator 17 includes a resonant circuit 171 including a negative resistor 172, an inductor 173, and a variable capacitor 174; a capacitive element group 175 for compensating for the element characteristics of the resonant circuit 171; and a switch 176 connected in series with the capacitive element group 175. The capacitive element group 175 includes a plurality of fixed-capacitance capacitors as capacitive elements. The capacitive elements turn to variable capacitors by various on/off patterns created by the switch 176. Therefore, a frequency calibration signal from the calibrator 16 is a multi-digit 1/0 signal instructing which capacitive element is connected to GND.

The calibrator 16 normally performs calibration of the voltage-controlled oscillator 17 when power to the clock and data recovery circuit 11 is turned on. By this, variations in the element characteristics of the resonant circuit 171 can be compensated for.

Figure 12:
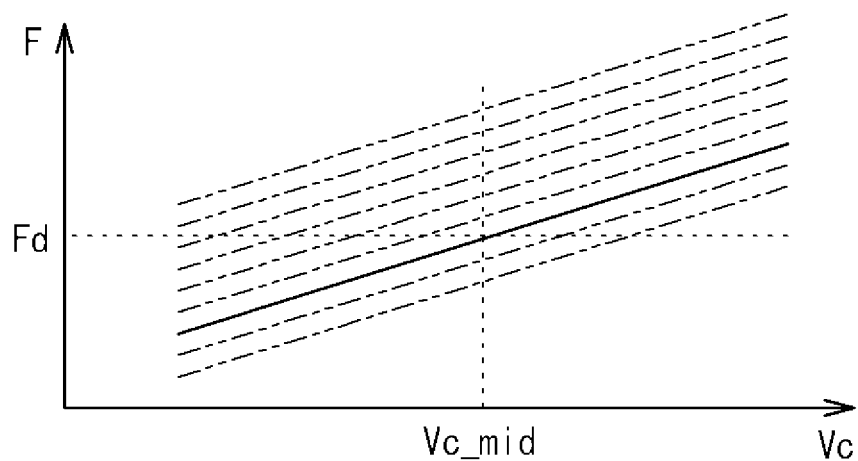
FIG. 12 is a graph showing the input and output characteristics of the voltage-controlled oscillator.

FIG. 12 is a graph showing the input and output characteristics (frequency characteristics) of the voltage-controlled oscillator 17. A horizontal axis represents the control voltage Vc of an input and a vertical axis represents the frequency of an output. In general, the control voltage Vc has a range. Thus, it is desirable that a desired frequency Fd be obtained at a voltage Vc_mid in the center of the range. However, if a voltage at which the desired frequency Fd is obtained is at an end of the control voltage range due to variations in element characteristics, then a wide control voltage range cannot be taken. Hence, by changing the on/off pattern of the capacitive element group 175 to change the overall capacitance, as shown in the drawing, the characteristics can be shifted in a vertical-axis direction. Therefore, by setting the on/off pattern of the capacitive element group 175 so as to obtain a characteristic indicated by a solid line where the desired frequency Fd and the voltage Vc_mid in the center of the range match the best, variations in element characteristics can be compensated for.

<Calibration Operation Performed as Needed>

Meanwhile, the calibrator 16 in the present embodiment performs calibration of the voltage-controlled oscillator 17 as needed, by a reset signal generated by an instruction from the managing unit 104. The managing unit 104 has the function of managing a schedule for receiving upstream signals. In addition, the managing unit 104 grasps at which timing a discovery period during which discovery is performed is inserted. Accordingly, the managing unit 104 can know a state having no received signal (upstream signal) from which a clock signal and a data signal are to be extracted. Hence, a time where the duration of such a state meets (is greater than or equal to) the time required for calibration by the calibrator 16 is selected to output a calibration instruction signal (reset signal) to the calibrator 16. Such a "time" includes, for example, the following.

Example 1

Figure 13:
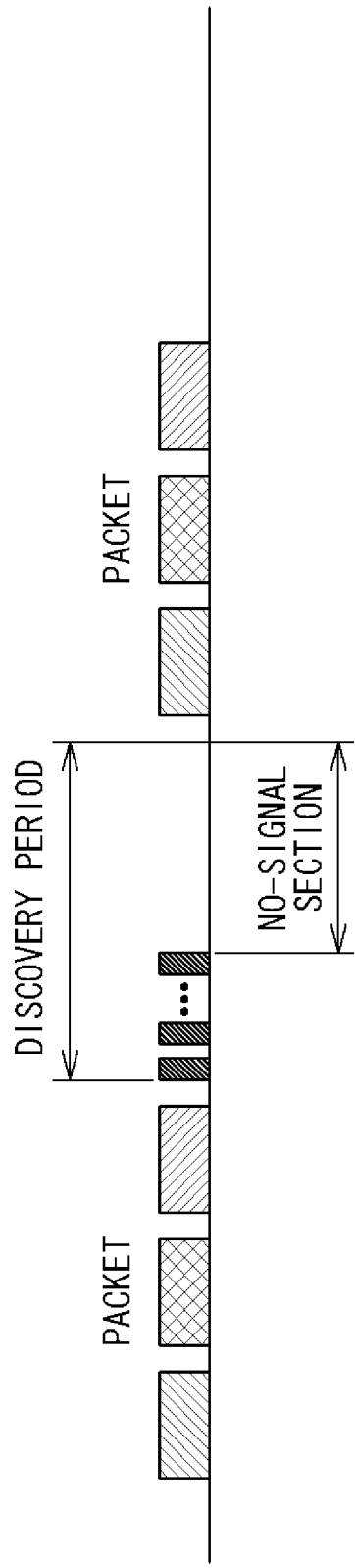
FIG. 13 is a diagram showing provision of a discovery period during an interval of receiving packets as upstream signals from the optical network units.

As described above, discovery of a new optical network unit by the optical line terminal 1 is periodically performed. FIG. 13 is a diagram showing provision of a discovery period during an interval of receiving packets as upstream signals from the optical network units 2 to 4, and a horizontal axis indicates time. In the drawing, although the time interval between packets is only on the order of at most one μsec, the discovery period has a time period of several hundred msec to one second. In addition, the discovery period normally has, in its second half, a no-signal section after completion of discovery. The length of this section may be greater than or equal to the time required for calibration. Hence, when, during a discovery period, a no-signal section occurs due to completion of discovery, if the remaining no-signal section is greater than or equal to the time required for calibration, then the managing unit 104 outputs a reset signal to the calibrator 16 at the same time as when the no-signal section begins. By this, the calibrator 16 performs calibration of the voltage-controlled oscillator 17.

Note that, since it is a no-signal section, a control voltage from the loop filter 15 has the same initial value as that for when power is turned on. At this time, if the frequency is changed due to temperature change, then the on/off pattern of the switch 176 is changed and a desired frequency is obtained. In this manner, temperature compensation can be performed by reset of the voltage-controlled oscillator 17. Such calibration can be performed by effectively using a no-signal section in the second half of a discovery period which is periodically assigned, and thus is convenient.

Note that although, in the above description, a reset signal is outputted to the calibrator 16 at the same time as when a no-signal section begins, they do not necessarily need to take place at the same time. Namely, it is also possible that, when a no-signal section is sufficiently longer than the time required for calibration, a reset signal is outputted after the no-signal section begins. In a word, at the time of outputting a reset signal, the remaining time in a no-signal section should meet the time required for calibration.

Example 2

Figure 14:
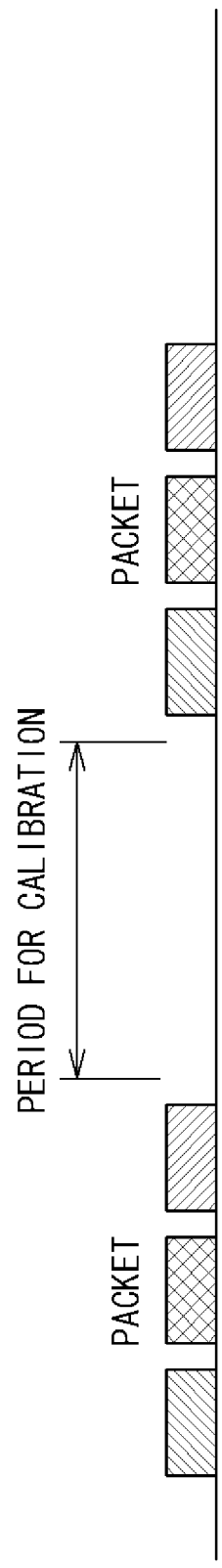
FIG. 14 is a diagram showing the case in which a period that is normally assignable as a discovery period is not used for discovery once every plurality of times, but is used for calibration.

Meanwhile, instead of a no-signal section of a discovery period such as that described above, a period that is periodically assignable as a discovery period may be used for calibration once every plurality of times. Specifically, as shown in FIG. 14, a period that is normally assignable as a discovery period is not used for discovery once every plurality of times, but is used as a period for calibration. Then, during this period, a reset signal is outputted to the calibrator 16 from the managing unit 104. In this case, calibration can be periodically and reliably performed such that discovery is skipped once every plurality of times.

Note that the above-described "once every plurality of times" is merely an example and thus calibration does not necessarily need to be performed with a certain frequency. Namely, the frequency (cycle) of performing calibration may vary. In a word, use of one of a plurality of periods which are assignable as discovery periods, to output a calibration instruction signal is repeated. By this, calibration can be repeatedly and reliably performed by using one of a plurality of periods which are assignable as discovery periods.

Example 3

In a multi-rate PON system, as shown in FIG. 8, a plurality of clock and data recovery circuits are provided to support the respective transmission rates. Thus, when any one of the clock and data recovery circuits is extracting a clock signal and a data signal from an upstream signal, it can be said that the other clock and data recovery circuit is in a state having no received signal from which a clock signal and a data signal are to be extracted. Therefore, for example, when packets with either one of transmission rates L and H continue, in a clock and data recovery circuit with the other transmission rate, the duration of a state having no received signal from which a clock signal and a data signal are to be extracted may be greater than or equal to the time required for calibration. Thus, in such a case, too, calibration of the voltage-controlled oscillator in the other clock and data recovery circuit can be performed.

As described in detail above, in a receiving unit including a clock and data recovery circuit 11 and having a calibrator 16 for a voltage-controlled oscillator 17 and a managing unit 104 or in an optical line terminal 1, when the duration of a state having no received signal (upstream signal) from which a clock signal and a data signal are to be extracted (so to speak, a free time) is greater than or equal to the time required for calibration, a calibration instruction signal is outputted to the calibrator 16 from the managing unit 104, whereby the oscillation frequency of the voltage-controlled oscillator 17 is calibrated. By performing such calibration as needed, frequency changes caused by changes in temperature can be calibrated. Therefore, without additionally providing a capacitive element for temperature compensation, the frequency characteristics of the voltage-controlled oscillator 17 resulting from temperature change can be compensated for.

<Others>

Note that although in the above-described embodiment a more complex multi-rate PON system (FIG. 1) is described, needless to say, temperature compensation by calibration can also be applied to a single (common)-rate clock and data recovery circuit. In the case of a single rate, a plurality of clock and data recovery circuits 11L and 11H do not need to be provided as shown in FIG. 8, and a single clock and data recovery circuit is provided. Note, however, that in this case, since calibration cannot be performed while the other clock and data recovery circuit is continuously performing a process, a discovery period or the like is used.

Figure 15:
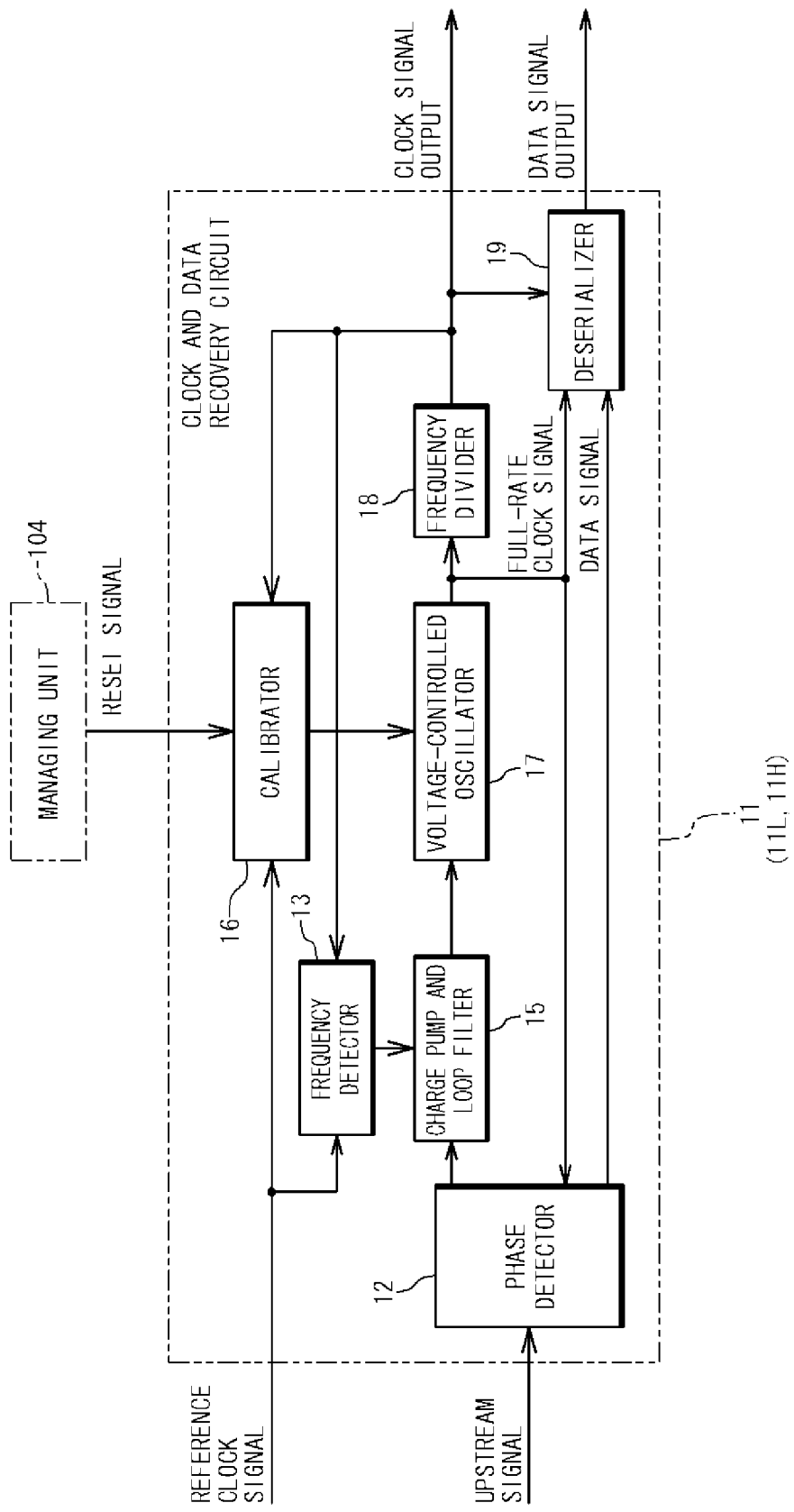
FIG. 15 is a block diagram showing the internal configuration of a clock and data recovery circuit for the case of a single transmission rate.

FIG. 15 is a block diagram showing a clock and data recovery circuit for the case of a single rate, in contrast to FIG. 9 for multi-rate support. As shown in the drawing, in this case, a switcher is not necessary.

Note that the embodiment disclosed herein is to be considered in all respects as illustrative and not restrictive. The scope of the present invention is indicated by the appended claims, and all changes which come within the meaning and range of equivalency of the claims are therefore intended to be embraced therein.

INDUSTRIAL APPLICABILITY

According to a receiving unit, an optical line terminal, and a frequency calibration method of the present invention, by performing, by a calibrator, calibration of the oscillation frequency of a voltage-controlled oscillator as needed, frequency changes caused by changes in temperature can be calibrated. Therefore, without providing a capacitive element for temperature compensation, the frequency characteristics of the voltage-controlled oscillator resulting from temperature change can be compensated for.

The invention claimed is:

1. A receiving unit that configures a PON system with a plurality of optical network units establishing a one-to-multiple connection therewith through optical fibers, and that receives upstream signals transmitted from the optical network units, the receiving unit comprising:
   a clock and data recovery circuit having a voltage-controlled oscillator and a calibrator that calibrates an oscillation frequency of the voltage-controlled oscillator, the clock and data recovery circuit extracting clock signals and data signals from the upstream signals; and
   a managing unit having a function of managing a schedule for receiving the upstream signals, the managing unit selecting a time where a duration of a certain state meets a time required for calibration by the calibrator to thereby output a calibration instruction signal to the calibrator, the state having no received signal from which a clock signal and a data signal are to be extracted.

2. An optical line terminal that configures a PON system with a plurality of optical network units establishing a one-to-multiple connection therewith through optical fibers, and that receives, by a time-division multiplexing scheme, upstream signals transmitted from the optical network units, the optical line terminal comprising:
   a clock and data recovery circuit having a voltage-controlled oscillator and a calibrator that calibrates an oscillation frequency of the voltage-controlled oscillator, the clock and data recovery circuit extracting clock signals and data signals from the upstream signals; and
   a managing unit having a function of managing a schedule for receiving the upstream signals, the managing unit selecting a time where a duration of a certain state meets a time required for calibration by the calibrator to thereby output a calibration instruction signal to the calibrator, the state having no upstream signal from which a clock signal and a data signal are to be extracted.

3. The optical line terminal according to claim 2, wherein the managing unit outputs the calibration instruction signal during a no-signal section within a discovery period for searching for a new optical network unit, the no-signal section occurring after completion of discovery.

4. The optical line terminal according to claim 2, wherein the managing unit repeats use of one of a plurality of periods to output the calibration instruction signal, the plurality of periods being assignable as discovery periods for searching for a new optical network unit.

5. An optical line terminal that configures a PON system with a plurality of optical network units establishing a one-to-multiple connection therewith through optical fibers, and that receives, by a time-division multiplexing scheme, upstream signals with a plurality of transmission rates transmitted from the optical network units, the optical line terminal comprising:
  a managing unit having a function of managing a schedule for receiving the upstream signals; and
  a plurality of clock and data recovery circuits, each having a voltage-controlled oscillator and a calibrator that calibrates an oscillation frequency of the voltage-controlled oscillator in response to a calibration instruction signal from the managing unit, the plurality of clock and data recovery circuits extracting clock signals and data signals for the upstream signals at a plurality of different types of transmission rates, wherein
  when a duration of a state in which any one of the clock and data recovery circuits continuously handles an upstream signal meets a time required to calibrate an oscillation frequency of a voltage-controlled oscillator in another clock and data recovery circuit, the managing unit outputs a calibration instruction signal to a calibrator in the other clock and data recovery circuit.

6. A frequency calibration method in the receiving unit according to claim 1, the frequency calibration method comprising:
  managing in advance a schedule for receiving signals by the clock and data recovery circuit;
  selecting a time where a duration of a certain state meets a time required for calibration by the calibrator, the state having no received signal from which a clock signal and a data signal are to be extracted; and
  performing calibration of the voltage-controlled oscillator by the calibrator.

* * * * *